June 25, 1940.  A. K. SMITH  2,205,934
CANE JUICE CLARIFIER
Filed June 8, 1939  2 Sheets-Sheet 1
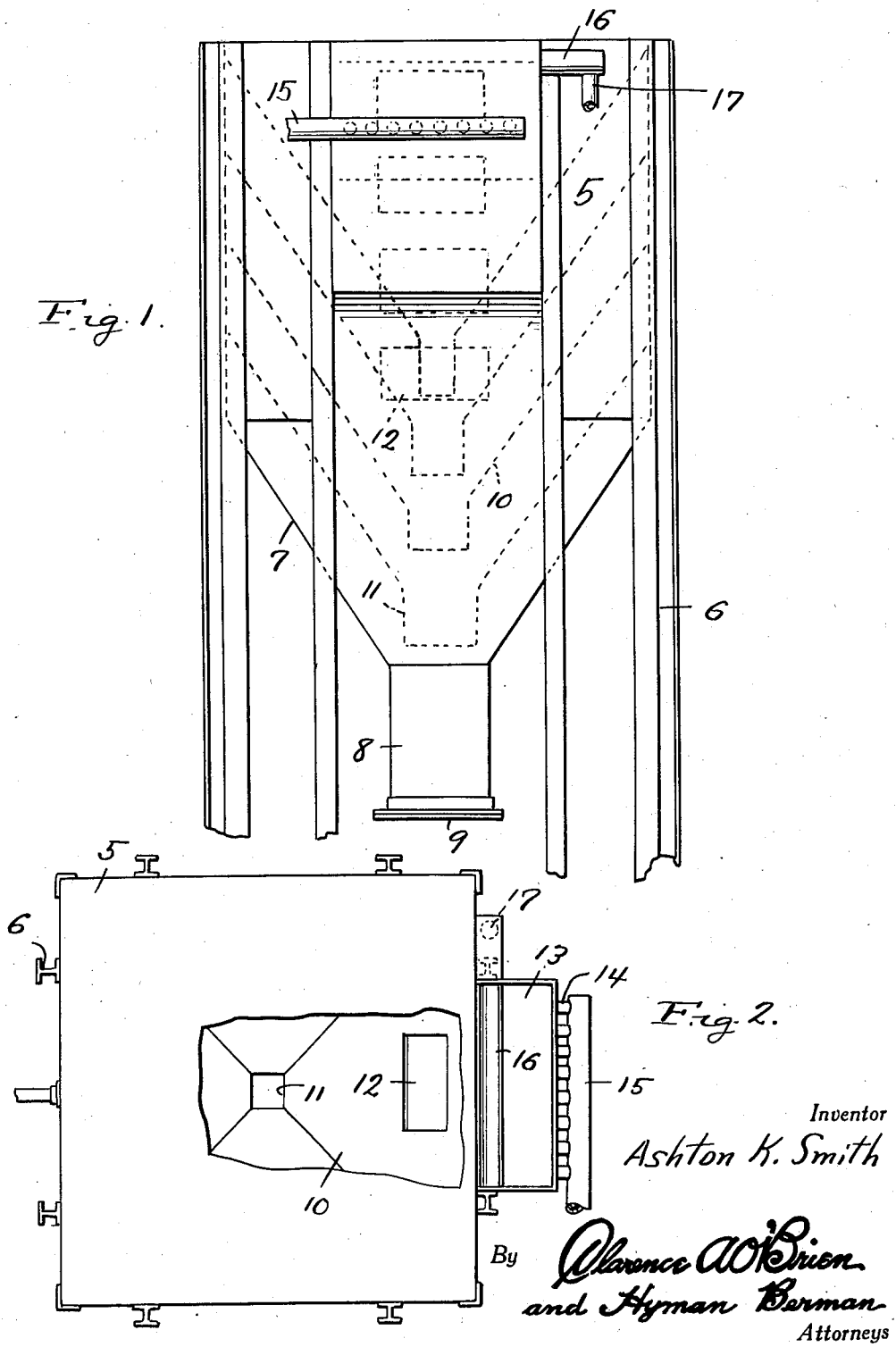
Inventor
Ashton K. Smith
By Clarence A. O'Brien
and Hyman Berman
Attorneys

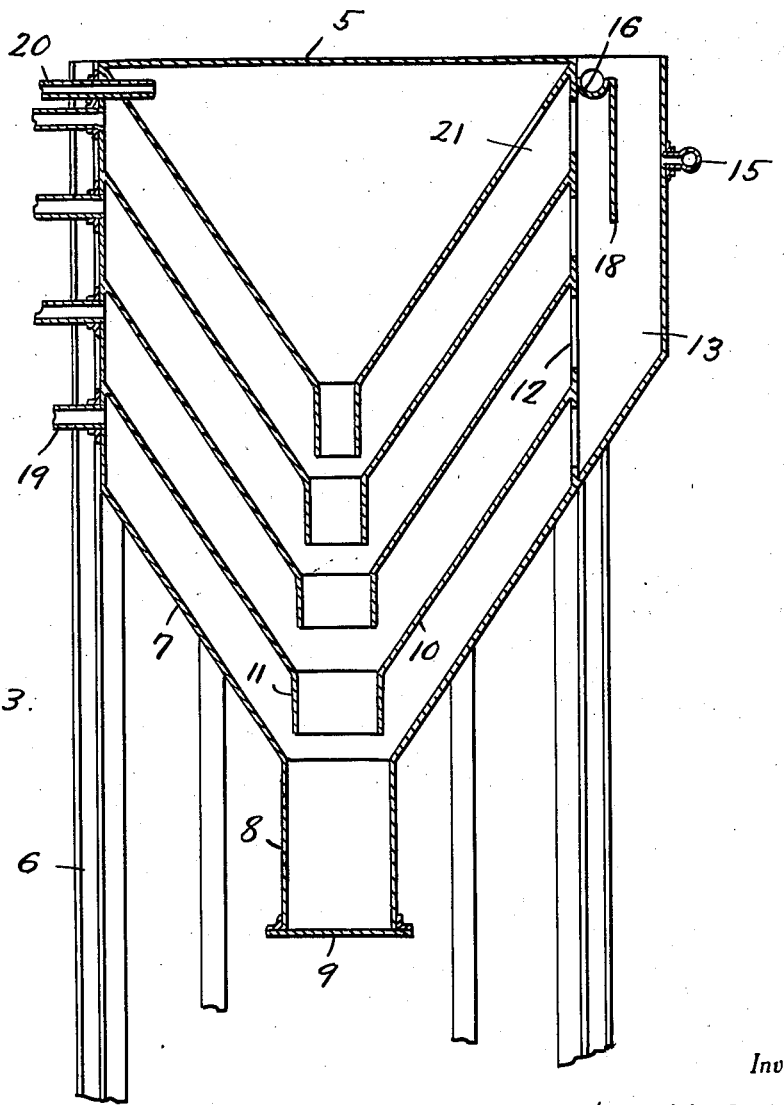

Patented June 25, 1940

2,205,934

UNITED STATES PATENT OFFICE 2,205,934

CANE JUICE CLARIFIER

Ashton K. Smith, Franklin, La.

Application June 8, 1939, Serial No. 278,161

2 Claims. (Cl. 210—58)

The present invention relates to improvements in cane juice clarifying machines and has for its primary object to provide a device of this character which eliminates the use of any moving parts or agitators and in which the scum and sediment is removed in an efficient manner while at the same time providing means for drawing off the clear juice.

A further object is to provide a device of this character of simple and practical construction, which is efficient and reliable in use, relatively inexpensive to manufacture and maintain in operation and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout and in which—

Figure 1 is a side elevational view.

Figure 2 is a top plan view with parts broken away and shown in section, and

Figure 3 is a vertical sectional view.

Referring now to the drawings in detail the numeral 5 designates a tank of square shape in cross section supported by legs or posts 6, the tank being closed on all sides, including the top, and having inwardly inclined bottom walls 7 converging toward the center of the tank from the four sides thereof to provide four bottom sections, and having at the central portion thereof a sediment trap 8 depending downwardly from the bottom and provided with a removable bottom plate 9.

Arranged in the tank are a plurality of vertically spaced baffles 10 substantially in the form of funnels, the baffles including sections arranged in successively vertically spaced relation above each of the four bottom sections of the tank and each of the baffles are formed at their central portions with depending discharge spouts 11, the spouts being of successively decreasing diameter in an upward direction.

One of the side walls of the tank is provided with vertically spaced openings 12 communicating with the interior of the tank above each of the respective baffles, said openings also providing communication with a chamber 13 formed on said side walls. The chamber 13 is open at its top and adjacent its upper portion and in its outer side walls is a plurality of nipples 14 communicating with a feed pipe 15 from which the hot juice from flash pot enters the chamber 13.

The chamber 13 constitutes a scum compartment and is provided in its upper portion with a trough 16 having a drain opening 17 at one end thereof, the free edge of the trough being provided with a downwardly depending baffle 18 spaced between the adjacent wall of the tank and the outer wall of the scum compartment and terminating in spaced relation above the bottom of the latter.

At the side of the tank opposite from the openings 12 are a plurality of drain pipes 19 communicating with the tank between each of the baffles 10 and a similar drain pipe 20 also communicates with the tank above the uppermost baffle. Said uppermost baffle is arranged with its edge portion at the top of the tank and accordingly is provided with an opening 21 adjacent the uppermost opening 12 in the side of the tank.

In the operation of the device hot juice from the flash pot enters the scum compartment through the feed pipe 15 and the nipples 14, the baffle 18 maintaining light floating matter and scum in the outer portion of the compartment and the liquid level of the juice is maintained in said compartment to allow the floating matter to overflow into the trough 16. The juice flows from the compartment 13 through the openings 12 into the main tank, the heavy material settling onto the inclined baffle 10 and continuing down through the spout 11 into the mud compartment or sediment trap 8. The clear juice is drawn off through any or all of the pipes 19 and 20 for conveying to the usual evaporator charge tank (not shown). The sediment collected in the trap 8 may be removed at suitable intervals.

It is believed the details of construction and manner of use of the device will be readily understood from the foregoing without further detailed explanation.

Having thus described the invention, what I claim is—

1. A clarifier of the class described comprising a main tank having an inclined bottom converging toward the center, a sediment trap depending from the center of said bottom, baffles coextensive with said bottom and spaced vertically in the tank in parallelism with the bottom, spouts depending from the center of the baffles, a scum chamber at one side of the tank communicating with the interior of the tank above each baffle, a feed pipe for the chamber, discharge pipes connected to the tank above each baffle and a vertical baffle in said chamber having its lower edge spaced above the bottom of the chamber.

2. A clarifier of the class described comprising a main tank having an inclined bottom converging toward the center, a sediment trap depending from the center of said bottom, baffles coextensive with said bottom and spaced vertically in the tank in parallelism with the bottom, spouts depending from the center of the baffles, a scum chamber at one side of the tank communicating with the interior of the tank above each baffle, a feed pipe for the chamber, discharge pipes connected to the tank above each baffle and a vertical baffle in said chamber having its lower edge spaced above the bottom of the chamber and a scum collecting trough at the upper edge of said vertical baffle.

ASHTON K. SMITH.